S. FRAND.
DOUGH BRAKE AND ATTACHMENT THEREFOR.
APPLICATION FILED FEB. 4, 1918.
1,291,468.
Patented Jan. 14, 1919.
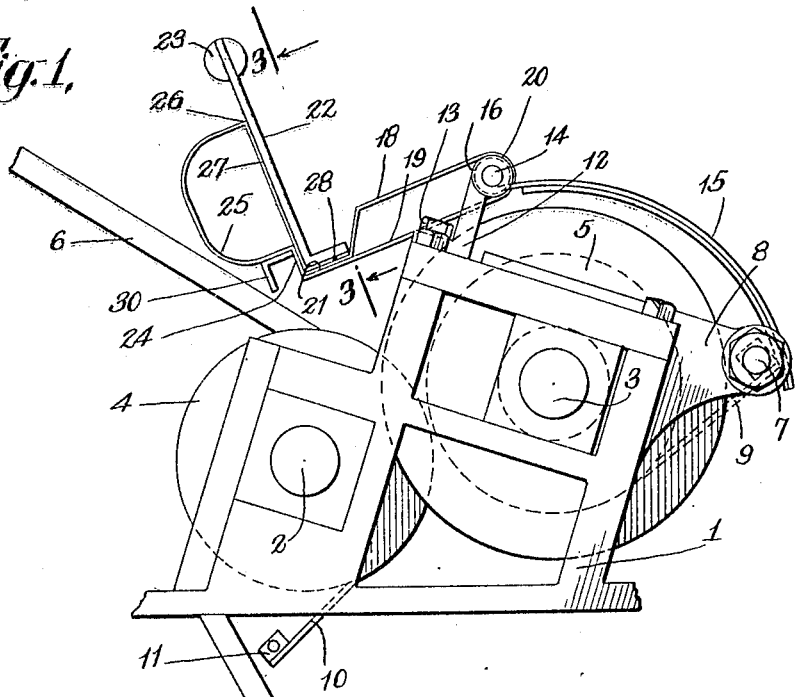
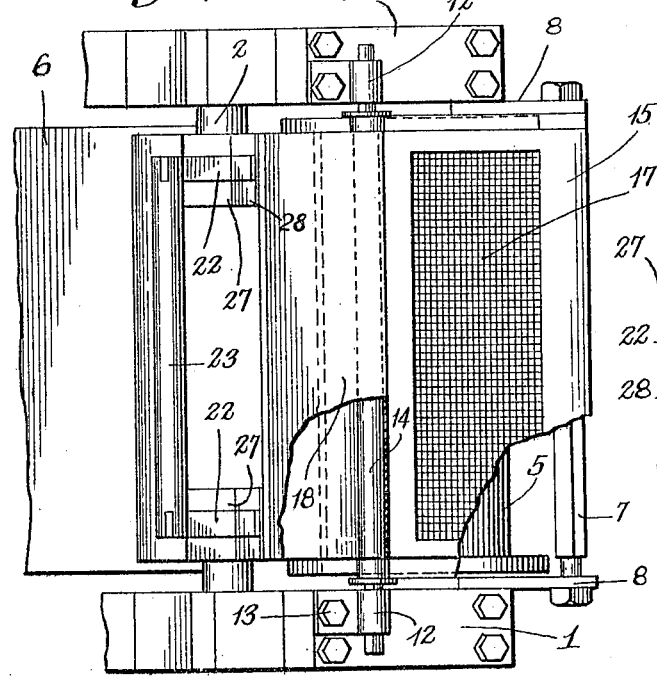
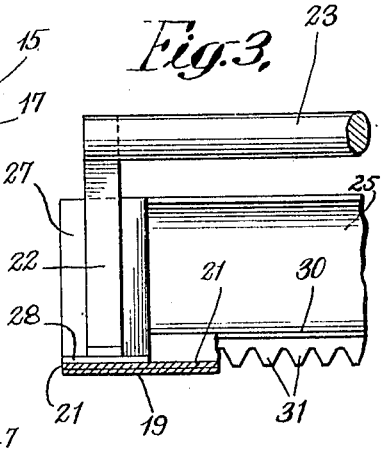
INVENTOR
Samson Frand
BY
J. C. Edmonds
ATTORNEY

UNITED STATES PATENT OFFICE.

SAMSON FRAND, OF NEW YORK, N. Y., ASSIGNOR TO NATIONAL BISCUIT COMPANY, OF NEW YORK, N. Y., A CORPORATION OF NEW JERSEY.

DOUGH-BRAKE AND ATTACHMENT THEREFOR.

1,291,468.  Specification of Letters Patent.  Patented Jan. 14, 1919.

Application filed February 4, 1918. Serial No. 215,228.

*To all whom it may concern:*

Be it known that I, SAMSON FRAND, a citizen of the United States, residing in the borough of Bronx, city, county, and State of New York, have invented certain new and useful Improvements in Dough-Brakes and Attachments Therefor, of which the following is a specification.

My invention relates to an attachment to be mounted on an upright brake adapted to sheet the dough for use in biscuit manufacture, etc. The attachment preferably comprises both a pivoted guard, preferably having a portion of wire mesh adapted to extend over the front roll of the brake, and a member mounted to the rear of the guard and adapted to press the dough firmly into contact with the surface of the chute leading to the rolls and to aid in its passage between the rolls. The lump of dough which is thrown on the chute must oftentimes be manipulated to start the same between the rolls, and this is accomplished in the usual practice by the operator leaning over the front roll and pressing the dough downwardly and forwardly with his fingers adjacent to the opening between the rolls. This is a dangerous operation and accidents are quite likely to occur. By my invention, I provide a device which is preferably secured to the frame of the machine by a sliding and pivotal connection, and which preferably carries both a series of pressing fingers and a curved surface rearwardly of the fingers. This device may be manipulated by a handle to engage the dough on the chute and press the same firmly into contact with the chute and toward the rolls in such manner that the layer of dough will be sufficiently thinned to permit it to pass between the rolls. When the device is out of operation, it may, if desired, be swung forwardly upon the guard member. The devices described are adapted to be added as an attachment to the brakes already manufactured, or to be provided as part of the equipment of such machines when the latter are manufactured.

In order that a clearer understanding of my invention may be had, attention is hereby directed to the accompanying drawings forming part of this application and illustrating certain embodiments of my invention. In the drawings, Figure 1 represents an end elevation of an upright brake with my attachment mounted thereon; Fig. 2 is a top plan view of the same, certain parts being broken away; and Fig. 3 is a partial section on line 3—3 of Fig. 1.

Referring to the drawings, the brake is illustrated as provided with end frames 1, 1, between which are mounted the shafts 2, 3, carrying the rolls 4, 5. The inclined chute 6 is adapted to deliver dough to the opening between the rolls. The rolls are adapted to be rotated by any convenient source of power, not shown. The framework is provided with a front rod 7, supported in front of the forward roll 5 by a pair of brackets 8, 8. Scrapers 9 and 10 may be mounted on rod 7 and brackets, such as 11, respectively, to press against the lower surfaces of the rolls.

Brackets 12, 12 are secured upon the top of side frames 1, 1 by suitable bolts 13, and carry a transverse shaft 14 above the rear portion of the forward roll 5. A curved guard 15 may be, and preferably is, pivotally hung on shaft 14 by means of a pair of straps 16, the forward end of this guard resting upon the front member 7 of the frame. This guard is preferably provided with a portion 17 of heavy wire screening, so that the condition of the roll may be seen therethrough, while at the same time the guard may be swung upwardly about shaft 14 when it is desired to obtain access to the roll for cleaning, etc.

The pressing device preferably comprises a sheet of metal bent in parallel relation, as shown at 18, 19, to form a slideway between which the shaft 14 is mounted, the forward portion of the sheet being formed to the curvature of shaft 14, as shown at 20 in Fig. 1. The upper portion 18 of the sheet is bent downwardly into contact with the lower portion 19 at the rear, as is shown at 21, to one end of the sheet. A pair of metal strips 22, 22, having their lower portions bent at right angles, are secured to the opposite ends of the rear portion of the sheet at 21 and carry the handle member 23 which may conveniently be a metal cylinder secured to the upper ends of the strips 22.

In the preferred form of my device, the metal of the lower sheet 19 is bent upwardly at the rear of the portion 21 of the upper sheet 18, as is shown at 24, for a comparatively short distance, and is then curved rearwardly, upwardly and again forwardly, as shown at 25. The metal is then again bent, as shown at 26, to form a downwardly extending plane portion 27 which is parallel to the portion 24 of the sheet and to the strips 22, portion 27 preferably being cut away to form a pair of vertical straps, as shown in Fig. 3, for the sake of lightness. The metal is then again bent forwardly to form short foot portions 28 resting immediately on the portion 21 of the sheet. With this construction, the bottom flanges of strips 22 are secured to the three thicknesses of metal 19, 21 and 28, and the body portions of the strips 22 are secured to the portions 27 of the sheet.

The bottom side of the curved portion 25 of the sheet has secured thereto an angle member 30, the lower edge of which is serrated to form a series of teeth or fingers 31, which are adapted to be pressed downwardly into the dough in the same manner that the operator has previously used his own fingers.

In the operation of the device, the attendant grasps handle 23 and presses the device downwardly against the dough, whenever the same must be manipulated, to cause it to properly feed between the rolls. In this operation, the curved portion 25 of the device will press against the dough to flatten the same, and the fingers 31 will further break up and manipulate the dough to enable it to pass between the rolls. In this operation, the device is pressed downwardly and forwardly to follow the dough along the inclined chute toward the rolls, the portions 18 and 19 of the device forming a loose slideway between which shaft 14 is mounted. This construction permits the movement of the pressing fingers downward and forward, as described above, the portions 18 and 19 of the device sliding upwardly and forwardly over shaft 14 and pivoting thereabout at the same time, to permit the movement described. It should be understood that the machine to which my invention is applied receives dough in the form of large lumps and roughly sheets the same, the sheets being passed through the rolls several times if necessary. The operator may use the described device as many times as he finds necessary during each passage of the dough ball or sheet through the rolls, and may swing the device forwardly about shaft 14 into a position at rest on the guard 15 at any time he desires, when no dough is passing through the machine.

What I claim is:—

1. The combination with a pair of rolls for sheeting dough, a supporting frame therefor and a chute leading thereto, of a rod carried by said frame above one of said rolls, and a device mounted to pivot on and slide at right angles over said rod, said device being provided with a pressing surface adapted to press dough against said chute, and toward the opening between the rolls.

2. The combination with a pair of rolls for sheeting dough, a supporting frame therefor and a chute leading thereto, of a rod carried by said frame above one of said rolls, a device mounted on said rod to pivot thereon and slide at right angles thereover, toward the opening between the rolls, and a series of pressing fingers carried by said device, so positioned as to press dough against said chute and toward the opening between the rolls.

3. The combination with a pair of rolls for sheeting dough, a supporting frame therefor and a chute leading thereto, of a device movably secured to said frame, provided with a handle, a curved dough pressing surface, and a series of pressing fingers arranged forwardly of said surface, said device being movable to cause said surface and fingers to press against dough on said chute.

4. The combination with a pair of rolls for sheeting dough, a supporting frame therefor and a chute leading thereto, of a bracket carried by said frame, a pivot carried by said bracket, and a pressing frame having a forward portion slidably and pivotally engaging said pivot, a rear portion extending upwardly from the rear end of the forward portion, and provided with a handle, and a pressing portion carried by the rear portion, adapted to be pressed against the dough on said chute as it moves toward the rolls.

5. The combination with a pair of rolls for sheeting dough, a supporting frame therefor and a chute leading thereto, of a pivot rod carried by said frame above the forward roll, and a pressing device having a rearwardly extending slideway through which said rod extends, and an upwardly extending rear portion having a pressing surface at its lower rear part, adapted to be pressed against dough on the chute as it approaches the rolls, to aid its passage therethrough.

6. The combination with a pair of rolls for sheeting dough one forwardly of the other, a supporting frame therefor and an inclined chute leading thereto, of a pivot rod carried by said frame above the forward roll, a guard pivoted thereto to extend forwardly over the forward roll, and a pressing device slidably pivoted to said rod, extending rearwardly and carrying a pressing surface adapted to press against dough on said chute as it approaches the rolls, said device being adapted to be swung forwardly into an inoperative position upon said guard.

This specification signed and witnessed this 28th day of January, 1918.

SAMSON FRAND.

Witnesses:
FREDERICK W. BODE,
L. D. KIDD.

Copies of this patent may be obtained for five cents each, by addressing the "Commissioner of Patents Washington, D. C."